United States Patent
Jeong et al.

(10) Patent No.: US 9,150,111 B1
(45) Date of Patent: Oct. 6, 2015

(54) ENGINE-GENERATOR CONTROL METHOD AND SERIES HYBRID ELECTRIC COMBAT MANEUVERING SYSTEM USING THE SAME

(71) Applicant: AGENCY FOR DEFENSE DEVELOPMENT, Daejeon (KR)

(72) Inventors: Soonkyu Jeong, Daejeon (KR); Myeongeon Jang, Daejeon (KR); Kyuhong Han, Daejeon (KR); Seungtai Yeo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 14/458,358

(22) Filed: Aug. 13, 2014

(30) Foreign Application Priority Data

Aug. 30, 2013 (KR) .................. 10-2013-0103870

(51) Int. Cl.
| | | |
|---|---|---|
| B60L 11/02 | (2006.01) |
| B60W 20/00 | (2006.01) |
| B60W 10/24 | (2006.01) |
| B60W 10/08 | (2006.01) |
| B60W 10/04 | (2006.01) |

(52) U.S. Cl.
CPC ...................... *B60L 11/02* (2013.01)

(58) Field of Classification Search
CPC .......................... B60L 11/02–11/14
See application file for complete search history.

(56) References Cited

U.S. PATENT DOCUMENTS

| | | | | |
|---|---|---|---|---|
| 6,328,671 | B1 * | 12/2001 | Nakajima et al. ............... | 477/46 |
| 2002/0062183 | A1 * | 5/2002 | Yamaguchi et al. ............ | 701/22 |
| 2007/0227792 | A1 * | 10/2007 | Yonemori et al. ........... | 180/65.3 |
| 2008/0284384 | A1 * | 11/2008 | Kato et al. ...................... | 322/17 |
| 2013/0033237 | A1 * | 2/2013 | Kim et al. ....................... | 322/25 |
| 2014/0081500 | A1 * | 3/2014 | Ito et al. .......................... | 701/22 |

FOREIGN PATENT DOCUMENTS

| | | |
|---|---|---|
| JP | 2008-306800 A | 12/2008 |
| JP | 2010-120433 A | 6/2010 |
| KR | 10-1998-0043949 A | 9/1998 |
| KR | 10-0792893 B1 | 1/2008 |
| KR | 20-2011-0002170 U | 3/2011 |
| KR | 10-1144614 B1 | 5/2012 |
| KR | 10-2012-0100372 A | 9/2012 |
| KR | 10-2012-0104027 A | 9/2012 |

* cited by examiner

*Primary Examiner* — Khoi Tran
*Assistant Examiner* — Dale Moyer
(74) *Attorney, Agent, or Firm* — LRK Patent Law Firm

(57) ABSTRACT

An engine-generator control method and a series hybrid electric combat maneuvering system using the control method are provided. The series hybrid electric combat maneuvering system includes a drive motor connected to an axle via a speed reducer, a Motor Control Unit (MCU) configured to control the drive motor, an engine-generator configured to generate electric power, a Generator Control Unit (GCU) configured to control the engine-generator, a high voltage battery, a Battery Management System (BMS) configured to manage the high voltage battery, and a Hybrid Control Unit (HCU) configured to control the MCU, the GCU, and the BMS.

7 Claims, 6 Drawing Sheets

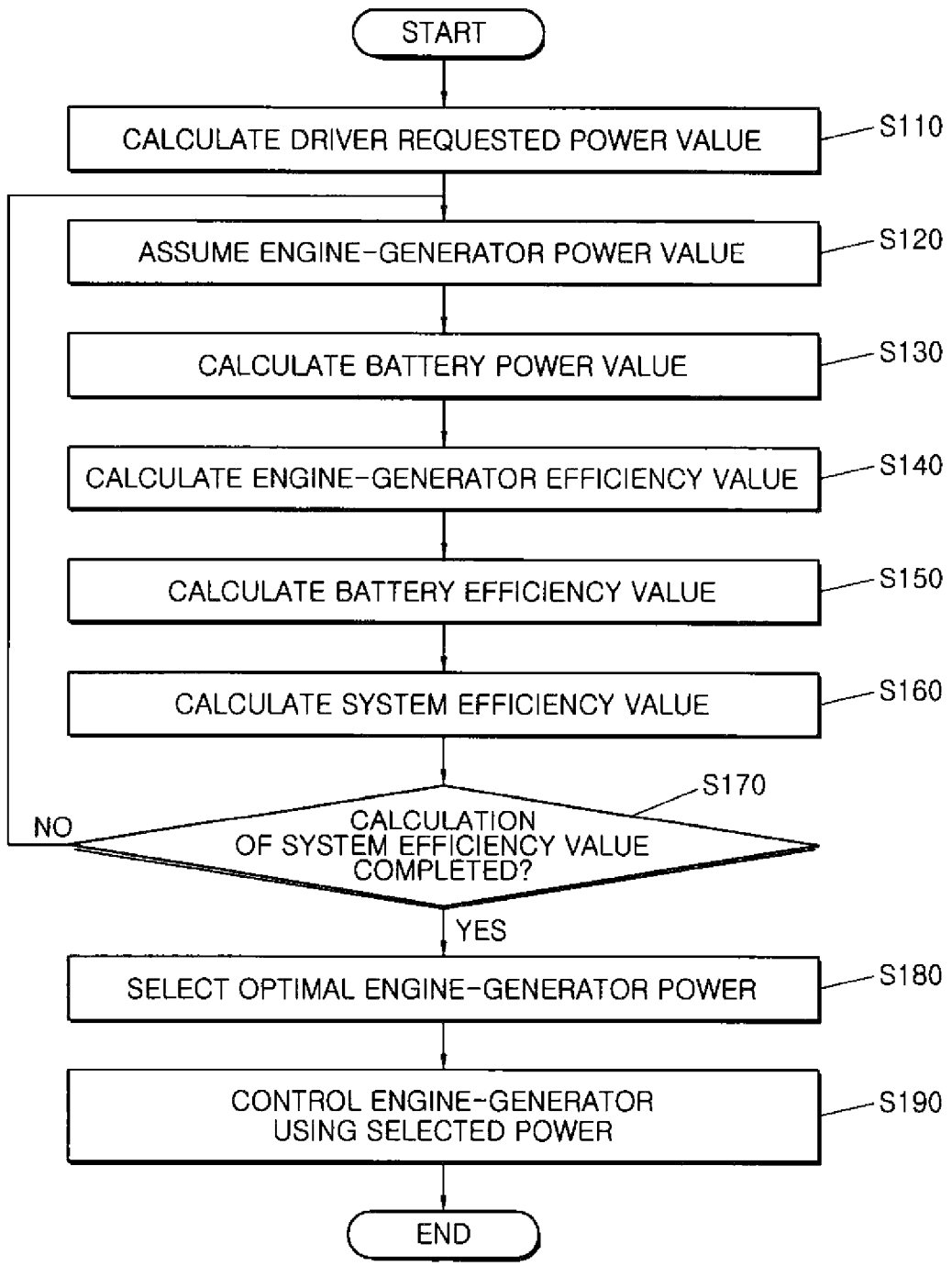

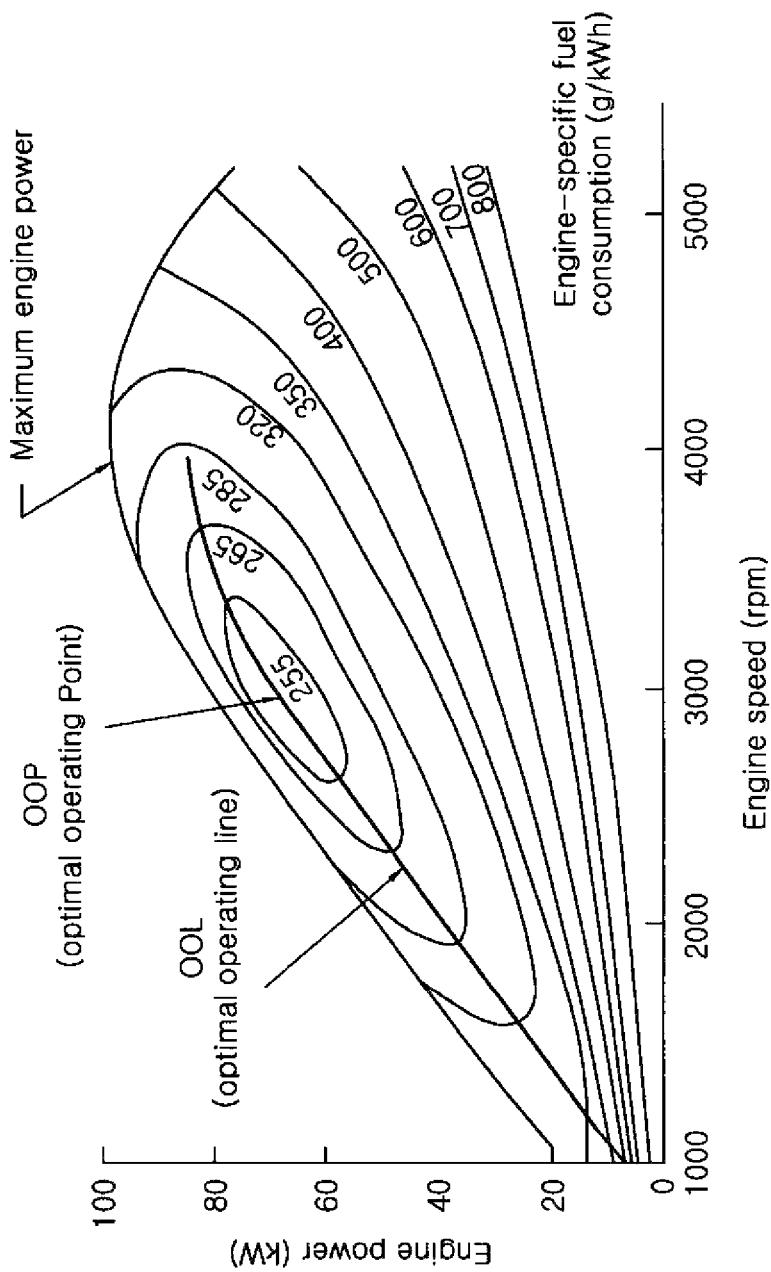

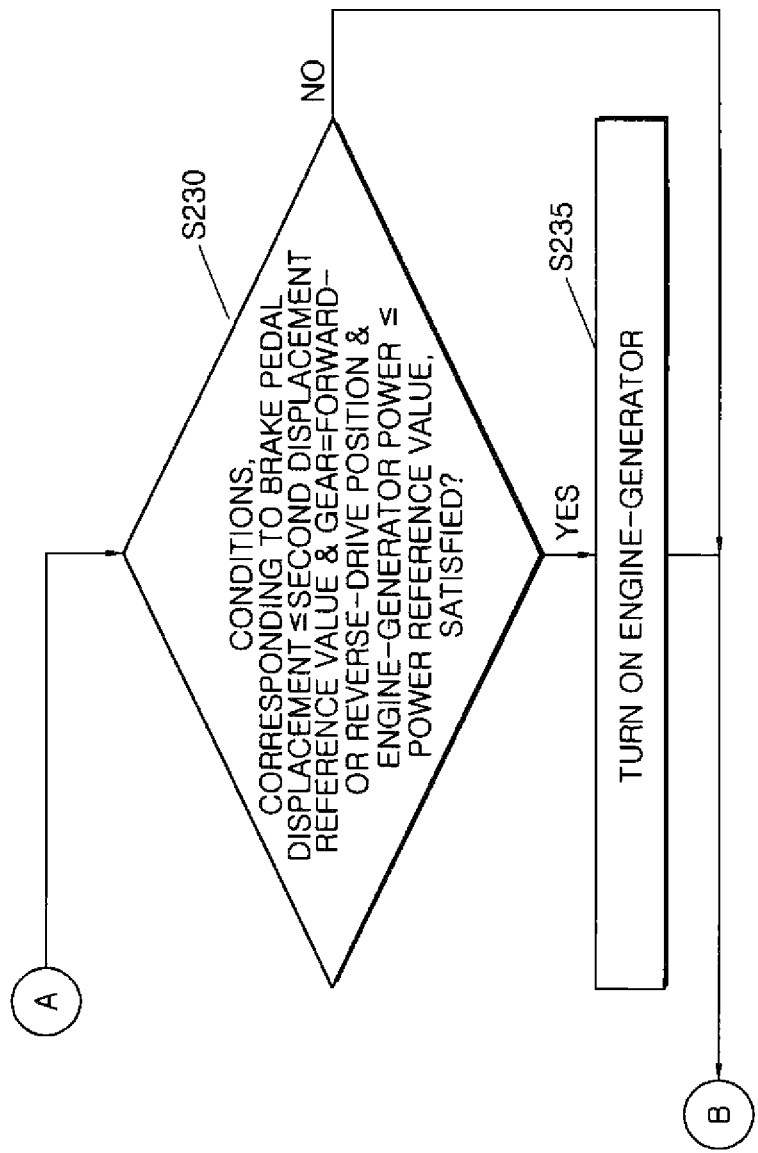

ENGINE-GENERATOR CONTROL METHOD AND SERIES HYBRID ELECTRIC COMBAT MANEUVERING SYSTEM USING THE SAME

CROSS REFERENCE TO RELATED APPLICATION

This application claims the benefit of Korean Patent Application No. 10-2013-0103870, filed Aug. 30, 2013, the entire contents of which are incorporated herein by reference.

TECHNICAL FIELD

The present inventive concept relates generally to an engine-generator control method and a series hybrid electric combat maneuvering system using the control method and, more particularly, to an engine-generator control method, which supplies electric power to the series hybrid electric combat maneuvering systems, and to a series hybrid electric combat maneuvering system using the control method.

BACKGROUND

Engine-generators applied to combat maneuvering systems, such as main battle tanks or armored vehicles, are devices for converting chemical energy contained in fuel, such as gasoline or diesel, into electrical energy via mechanical energy.

Generally, such an engine-generator functions to supply electric power to a series hybrid electric combat maneuvering systems. The series hybrid electric combat maneuvering system is configured such that a drive source, such as a drive motor, drives a vehicle using the electric power supplied from the engine-generator.

Electrical energy produced by the engine-generator may be directly supplied to an electrically-driven motor or may be used to charge a battery and then be reused later. Generally, an engine-generator control method applied to a series hybrid electric combat maneuvering system is basically operated only at an Optimal Operating Point (OOP) at which the efficiency of the engine-generator is best, and determines whether to operate the engine-generator depending on the State Of Charge (SOC) of a battery.

That is, such an engine-generator control method is a scheme for, if the SOC of the battery is decreased to a predetermined level or less, turning on the engine-generator, and if the SOC is increased to the predetermined level or more, turning off the engine-generator, and consistently operating the engine-generator at OOP.

Even though the engine-generator control method can improve the efficiency of the engine-generator itself using the method, the amount of charge/discharge current of a battery is excessively increased, thus deteriorating the efficiency of the overall system. Such an excessive current of the battery may increase the fluctuation of the battery voltage, thus various electronic parts.

Further, such an engine-generator control method is disadvantageous in that the accelerator pedal of a vehicle and the operating point of the engine are independent, so the feel of driving is greatly different from that of conventional vehicles and is generally unpleasant to the driver, and in that a point corresponding to OOP typically denotes a high-powerpoint, so that the engine is always operated at high power and then can be damaged.

Furthermore, such an engine-generator control method is disadvantageous in that if the engine is turned off after the vehicle has stopped while the engine-generator is charging the battery due to low SOC, the engine suddenly stops.

SUMMARY

Accordingly, the present inventive concept has been made keeping in mind the above problems occurring in the prior art, and an object of the present inventive concept is to provide an engine-generator control method and a series hybrid electric combat maneuvering system using the control method, which can improve the durability of electronic parts including an engine and improve the feeling of driving while also improving the efficiency of the overall system based on control in which the efficiencies of both the engine-generator and the battery are taken into consideration, and the stop-go driving of a vehicle is also taken into consideration.

In accordance with an aspect of the present inventive concept to accomplish the above object, there is provided an engine-generator control method for controlling an engine-generator for supplying power to a series hybrid electric combat maneuvering system having a battery and a drive motor, including (a) detecting an accelerator pedal displacement signal and a brake pedal displacement signal, and calculating a requested power that is total power of the drive motor requested by a driver; (b) assuming power values of the engine-generator at equidistant intervals from minimum power to maximum power of the engine-generator; (c) calculating a power of the battery required to satisfy total power of the drive motor requested by the driver, using the assumed power values of the engine-generator and the requested power; (d) calculating an efficiency of the engine-generator using an efficiency map of the engine-generator, and calculating an efficiency of the battery using an efficiency map of the battery which is the function of the battery power and a measured State Of Charge (SOC) of the battery; (e) calculating system efficiency of the combat maneuvering system, for every assumed power value of the engine-generator at the equidistant intervals, using the efficiency of the engine-generator and the efficiency of the battery; and (f) selecting an assumed power of the engine-generator, obtained for a highest system efficiency, and controlling the engine-generator at the selected assumed power.

The engine-generator control method may further include when the engine-generator is controlled at the assumed power of the engine-generator selected by performing (a) to (f), if a velocity of the combat maneuvering system is less than or equal to a preset velocity reference value, and a displacement of the brake pedal is equal to or greater than a preset first displacement reference value, turning off the engine-generator, and again performing (a) to (f); when the engine-generator is controlled using the assumed power value of the engine-generator selected by performing (a) to (f), if the displacement of the brake pedal is less than or equal to a preset second displacement reference value and a gear of the combat maneuvering system is in a forward-drive position or in a reverse-drive position, and if the selected assumed power value of the engine-generator is less than or equal to a preset power reference value, turning on the engine-generator, and again performing (a) to (f).

The velocity reference value may be set to 1 kph, the first displacement reference value may be set to 5%, the second displacement reference value may be set to 3%, and the power reference value may be set to 45 kW.

When a rotational speed of the drive motor corresponding to the velocity of the combat maneuvering system requested by the driver is $N_m$[rpm], and a requested torque of the driver is $T_{req}$[Nm], the requested power value $P_{req}$[kw] may be calculated by the following Equation (I):

$$P_{req} = \frac{2\pi}{60} \times N_m \times T_{req} \times \frac{1}{1000} \quad (1)$$

The battery power value $P_{bat}$ using the assumed power value $P_{gen}$ of the engine-generator and the requested power value $P_{req}$ may be calculated by the following Equation (2):

$$P_{bat} = P_{req} - P_{gen} \quad (2)$$

When the efficiency value of the engine-generator is $\eta_{gen}$ and the efficiency value of the battery is $\eta_{bat}$, the system efficiency value $\eta_{sys}$ may be calculated by the following Equation (3):

$$\eta_{sys} = \eta_{gen} \times \eta_{bat} \quad (3)$$

In accordance with another aspect of the present inventive concept to accomplish the above object, there is provided a Series hybrid electric combat maneuvering system, including a drive motor connected to an axle via a speed reducer; a Motor Control Unit (MCU) configured to control the drive motor; an engine-generator configured to generate electric power; a Generator Control Unit (GCU) configured to control the engine-generator; a high voltage battery; a Battery Management System (BMS) configured to manage the high voltage battery; and a Hybrid Control Unit (HCU) configured to control the MCU, the GCU, and the BMS, wherein the HCU is configured to detect an accelerator pedal displacement signal and a brake pedal displacement signal, and calculate a requested power value that is total power of the drive motor requested by a driver, assume power values of the engine generator at regular intervals from minimum power to maximum power of the engine-generator, calculate a power value of the battery required to satisfy total power of the drive motor requested by the driver, using the assumed power values of the engine-generator and the requested power value, calculate an efficiency value of the engine-generator using an efficiency map of the engine-generator, and calculate an efficiency value of the battery using an efficiency map of the battery set for the battery power value and a measured State Of Charge (SOC) value of the battery, calculate system efficiency values of the combat maneuvering system, for respective assumed power values of the engine-generator output at the regular intervals, using the efficiency value of the engine-generator and the efficiency value of the battery, and select an assumed power value of the engine-generator, obtained for a highest system efficiency value of the calculated system efficiency values, and control the engine-generator using the selected assumed power value.

BRIEF DESCRIPTION OF THE DRAWINGS

The above and other objects, features and advantages of the present inventive concept will be more clearly understood from the following detailed description taken in conjunction with the accompanying drawings, in which:

FIG. 1 is a flowchart showing an engine-generator control method according to an embodiment of the present inventive concept;

FIG. 2 is a diagram showing the efficiency map of an engine-generator according to an embodiment of the present inventive concept;

FIGS. 3A and 3B are flowcharts showing an engine-generator control method according to another embodiment of the present inventive concept;

DETAILED DESCRIPTION

Figure 3A:
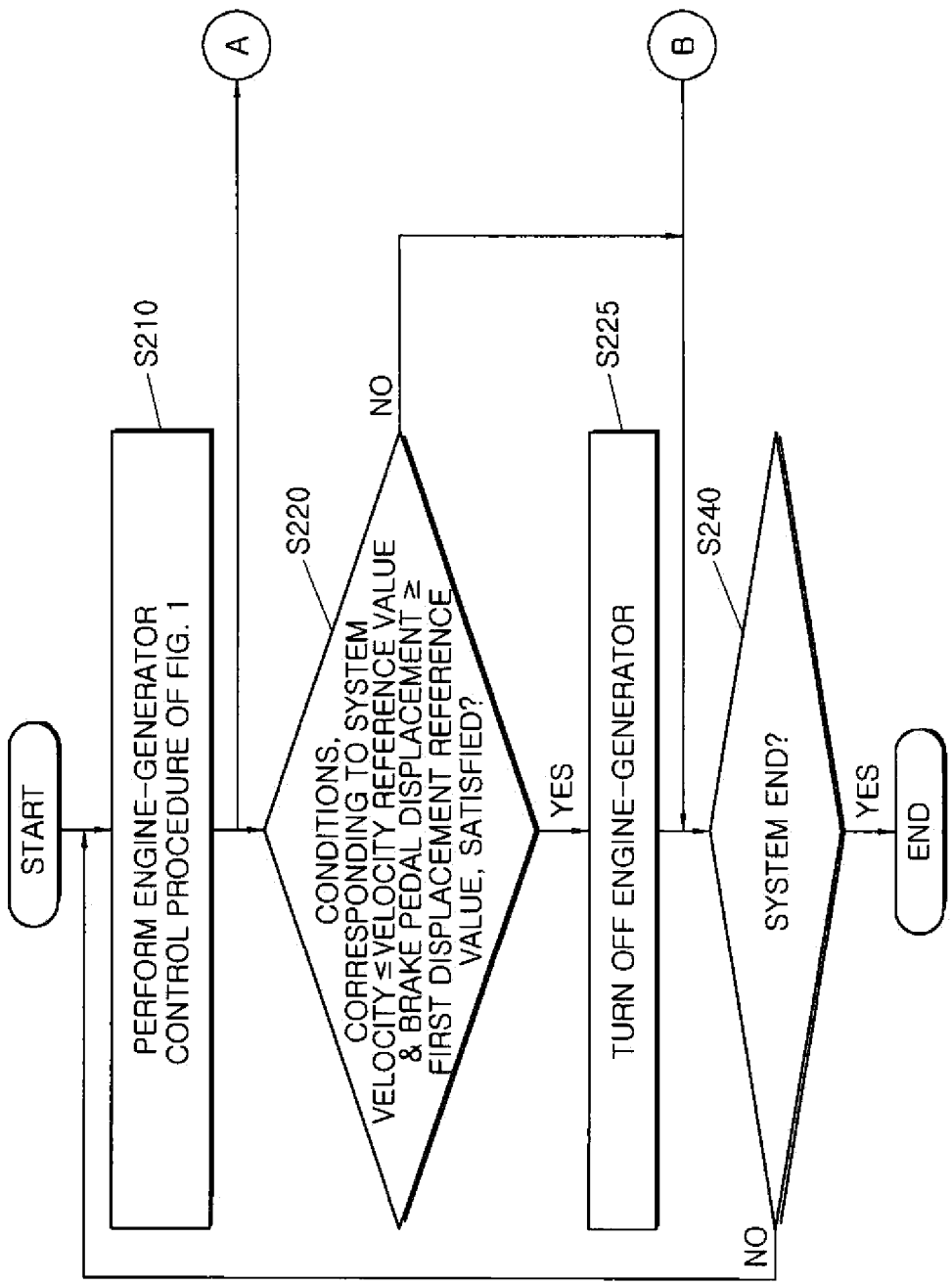

The present inventive concept will be described in detail below with reference to the accompanying drawings. Repeated descriptions and descriptions of known functions and configurations which have been deemed to make the gist of the present inventive concept unnecessarily obscure will be omitted below. The embodiments of the present inventive concept are intended to fully describe the present inventive concept to a person having ordinary knowledge in the art to which the present inventive concept pertains. Accordingly, the shapes, sizes, etc. of components in the drawings may be exaggerated to make the description clearer.

FIG. 1 is a flowchart showing an engine-generator control method according to an embodiment of the present inventive concept. An engine-generator functions to supply electric power required to activate a combat maneuvering system corresponding to a series hybrid electric combat maneuvering system provided with a battery and a drive motor. The series hybrid electric combat maneuvering system generally includes a battery for storing electrical energy and a drive motor for driving the combat maneuvering system.

Referring to FIG. 1, a controller functioning to control the engine-generator detects an accelerator pedal displacement signal and a brake pedal displacement signal and calculates a requested power value that is the total power of the drive motor requested by a driver at step S110.

The total power of the drive motor is the power of one drive motor when the combat maneuvering system is a two-wheel drive (2WD) vehicle-type system, and is the power corresponding to the sum of powers of two motors when the combat maneuvering system is a 4WD vehicle-type system.

If it is assumed that, for the velocity $V_{car}$ of the combat maneuvering system requested by the driver, the rotational speed of the drive motor is $N_m$[rpm], and the driver requested torque is $T_{req}$[Nm], the requested power value that is requested by the driver, that is, $P_{req}$[kw], may be obtained by the following Equation (1):

$$P_{req} = \frac{2\pi}{60} \times N_m \times T_{req} \times \frac{1}{1000} \quad (1)$$

Next, the controller assumes any power values of the engine-generator at regular intervals from the minimum power to the maximum power of the engine-generator at step S120. The engine-generator control method may be configured such that, when the minimum power of the engine-generator is, for example, 20 kW, and the maximum power of the engine-generator is 120 kW, the assumed power values of the engine-generator may be set to 20 kW, 25 kW, 30 kW, 120 kW if the regular intervals are 5 kW-intervals.

Then, by using the assumed power values $P_{gen}$ of the engine-generator and the requested power value $P_{req}$, the controller may calculate the battery power value $P_{bat}$ using the following Equation (2), in order to cover the total power requested by the driver using the battery and the engine-generator, at step S130.

$$P_{bat} = P_{req} - P_{gen} \quad (2)$$

As a result of this calculation, the battery power value corresponding to a positive value means the discharge of the battery, and the battery power value corresponding to a negative value means the charge of the battery.

The controller calculates the efficiency value of the engine-generator $\eta_{gen}$ from an Optimal Operating Line (OOL), having the best efficiency in the efficiency map of the engine-generator shown in FIG. 2, at step S140. FIG. 2 illustrates the efficiency map of the engine-generator according to an embodiment of the present inventive concept.

Then, the controller calculates a battery efficiency value $\eta_{bat}$ using the battery efficiency map set for the battery power value $P_{bat}$ and the measured SOC (State Of Charge) of the battery at step S150.

Next, the controller calculates the system efficiency value $\eta_{sys}$ of the combat maneuvering system by using the engine-generator efficiency value $\eta_{gen}$ calculated at step S140 and the battery efficiency value $\eta_{bat}$ calculated at step S150, as given by the following Equation (3), at step S160.

$$\eta_{sys} = \eta_{gen} \times \eta_{bat} \quad (3)$$

Then, the controller determines whether the calculation of the system efficiency value has been completed for each of the assumed power values $P_{gen}$ of the engine-generator, output at step S120, at step S170. If it is determined that the calculation of the system efficiency value has not yet been completed, the process returns to step S120.

If it is determined at step S170 that the calculation of the system efficiency value has been completed, the controller selects the assumed power value of the engine-generator at which the system efficiency value is highest at step S180, and controls the engine-generator using the selected assumed power value at step S190.

In this way, in accordance with the engine-generator control method according to the present embodiment, the efficiency of the overall system can be improved, and the power of the engine is variable depending on the condition of an accelerator pedal, the voltage of the battery is maintained at constant voltage, and the power of the engine-generator is reduced when the vehicle is moving at low speed or is stopped, so that the engine-generator may be easily turned on or off, thus improving the convenience of driving and the durability of the system.

Hereinafter, an engine-generator control method according to another embodiment of the present inventive concept will be described with reference to FIGS. 3A and 3B. FIGS. 3A and 3B are flowcharts showing an engine-generator control method according to another embodiment of the present inventive concept.

The engine-generator control method according to the present embodiment is intended to add ON/OFF control for the engine-generator to the engine-generator control method according to the above embodiment. Here, a control procedure identical to that described in the engine-generator control method in the above embodiment will be omitted.

First, when the system is activated, the controller performs the control procedure of FIG. 1, and performs control of the engine-generator in consideration of the efficiency of the overall system at step S210.

Next, the controller determines whether the velocity of the combat maneuvering system is less than or equal to a preset velocity reference value, and whether the displacement of a brake pedal is equal to or greater than a preset first displacement reference value at step S220. Here, the velocity reference value may be about 1 kph, and the first displacement reference value may be set to about 5%. Such reference values may be changed to other values by a user.

If it is determined at step S220 that the velocity of the combat maneuvering system exceeds the velocity reference value or that the displacement of the brake pedal is less than the first displacement reference value, the controller returns to step S210 to perform optimal control of the engine-generator according to the above embodiment, as long as the system is not terminated at step S240.

In contrast, if it is determined at step S220 that the velocity of the combat maneuvering system is less than or equal to the velocity reference value, and the displacement of the brake pedal is equal to or greater than the first displacement reference value, the controller turns off the engine-generator at step S225, and returns to step S210 to perform the optimal control of the engine-generator according to the above-described embodiment, as long as the system is not terminated at step S240.

Meanwhile, the controller performs step S220 while determining whether the displacement of the brake pedal is less than a preset second displacement reference value, whether the gear of the combat maneuvering system is in a forward-drive position or in a reverse-drive position, and whether the assumed power value of the engine-generator selected at step S210 is less than or equal to a preset power reference value at step S230. Here, the second displacement reference value may be set to about 3%, and the power reference value may be set to 45 kW.

If it is determined at step S230 that the displacement of the brake pedal exceeds the second displacement reference value or that the gear is neither in the forward-drive position nor the reverse-drive position, or that the assumed power value of the engine-generator exceeds the power reference value, the controller returns to step S210 to perform the optimal control of the engine-generator according to the above-described embodiment as long as the system is not terminated at step S240.

In contrast, if it is determined at step S230 that the displacement of the brake pedal is equal to or less than the second displacement reference value, the gear is in a forward-drive or reverse-drive position, and the assumed power value of the engine-generator is less than or equal to the power reference value, the controller turns on the engine-generator at step S235, and returns to step S210 to perform the optimal control of the engine-generator according to the above-described embodiment as long as the system is not terminated at step S240.

In this way, the engine-generator control method according to the other embodiment of the present inventive concept may supplement the disadvantage of the above embodiment in which, if the power of the engine-generator is controlled depending on the optimal efficiency by the engine-generator control method, the vehicle is moved at low speed or is stopped, and the power of the engine-generator is decreased, and in which, if the vehicle is completely stopped, the engine-generator is operated in an engine low-power section in which system efficiency is high, but the efficiency of the engine itself is low.

That is, the engine-generator control method according to the other embodiment of the present inventive concept can reduce noise while reducing unnecessary fuel consumption by turning off the engine-generator when the system is stopped, and can improve the efficiency of energy distribution by again turning on the engine-generator when the driver starts the vehicle.

Figure 4:
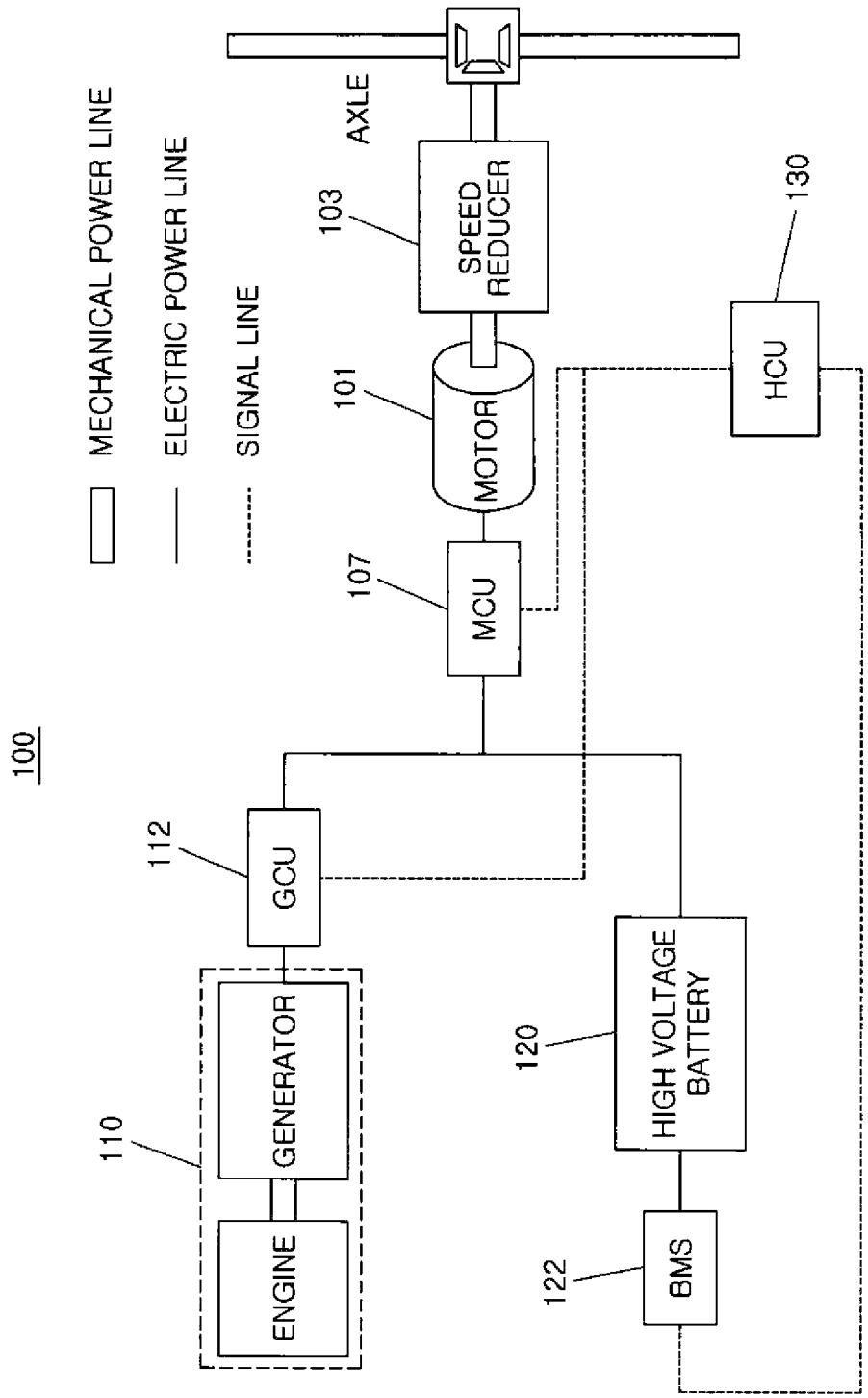
FIG. 4 is a configuration diagram of a 2WD series hybrid electric combat maneuvering system to which the engine-generator control method according to the present inventive concept is applied.
Figure 5:
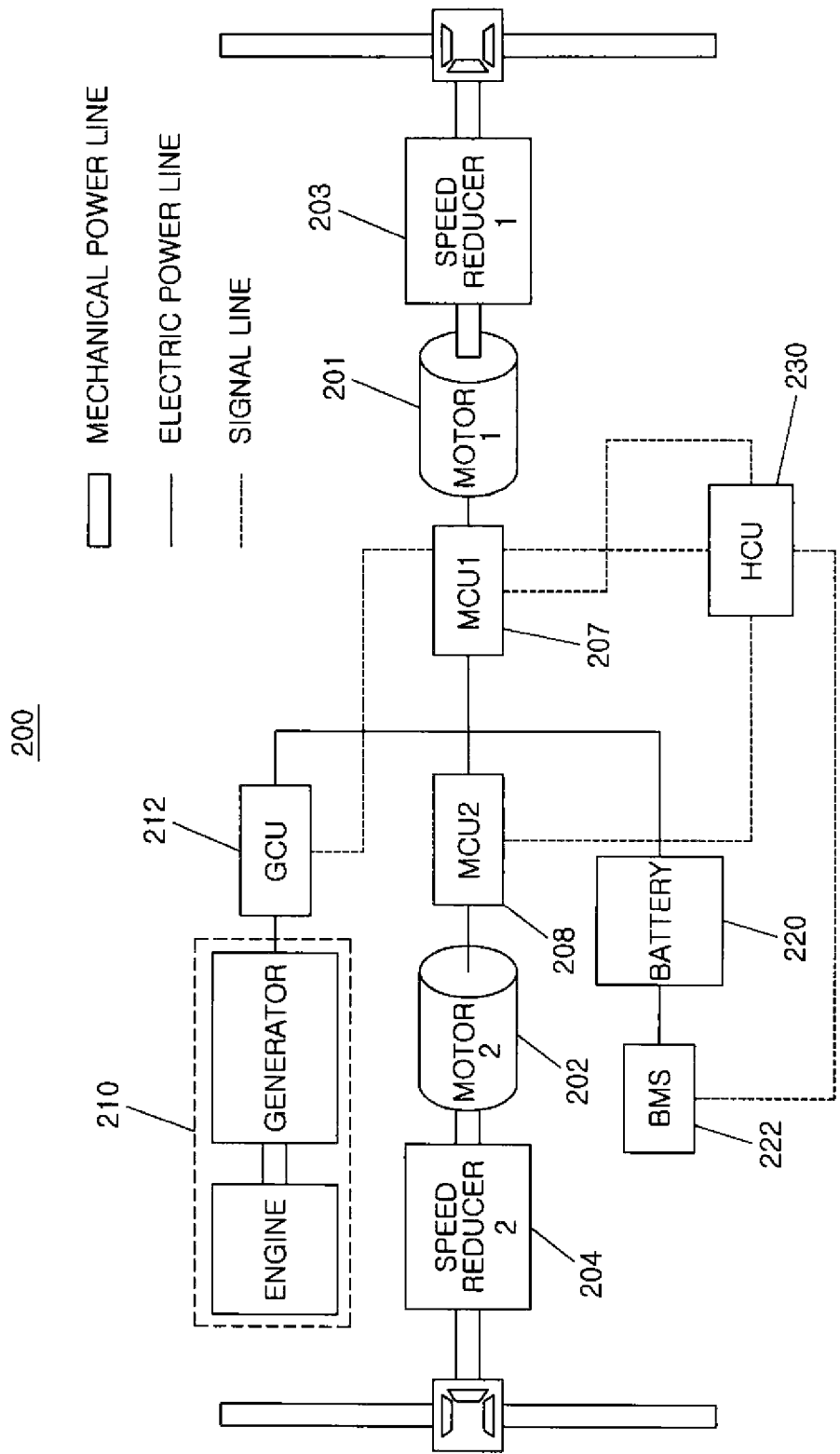
FIG. 5 is a configuration diagram of a 4WD series hybrid electric combat maneuvering system to which the engine-generator control method according to the present inventive concept is applied.

Hereinafter, a series hybrid electric combat maneuvering system to which the engine-generator control method according to the present inventive concept is applied will be described in detail with reference to FIGS. 4 and 5. FIG. 4 is a configuration diagram of a two-wheel drive (2WD) series hybrid electric combat maneuvering system to which the engine-generator control method according to the present inventive concept is applied, and FIG. 5 is a configuration diagram of a four-wheel drive (4WD) series hybrid electric combat maneuvering system to which the engine-generator control method according to the present inventive concept is applied.

Referring to FIG. 4, a 2WD series hybrid electric combat maneuvering system 100 to which the engine-generator control method according to the present inventive concept is applied is configured such that a single drive motor 101 is connected to a differential gear and an axle via a speed reducer 103. The drive motor 101 is controlled by a Motor Control Unit (MCU) 107, and an engine-generator 110, in which an engine and a generator are mechanically connected, is controlled by a Generator Control Unit (GCU) 112.

The MCU 107, the GCU 112, and a high-voltage battery 120 are connected through a power line. The high-voltage battery 120 is managed by a Battery Management System (BMS) 122. The BMS 122, the GCU 112, and the MCU 107 are controlled by a Hybrid Control Unit (HCU) 130.

The HCU 130, which is a hybrid-propulsion controller, functions to determine a driver's driving intention using signals transferred from an accelerator pedal, a brake pedal, a gear, etc., generate a torque command corresponding to the determined driving intention, transfer the torque command to the MCU 107, also transfer a control command for the control of the engine-generator 110 to the GCU 112, and control the entirety of the vehicle.

The engine-generator control method in accordance with the above-described embodiments may be performed by the HCU 130 of the 2WD series hybrid electric combat maneuvering system 100, and may control the engine-generator 110 while operating in conjunction with the GCU 112.

Referring to FIG. 5, a 4WD series hybrid electric combat maneuvering system 200 to which the engine-generator control method of the present inventive concept is applied is configured such that a first motor 201 is connected to a differential gear and a front axle via a first speed reducer 203, and a second motor 202 is connected to the differential gear and a rear axle via a second speed reducer 204 in order for the two drive motors 201 and 202 to drive a front axle and a rear axle, respectively.

The first motor 201 is controlled by an MCU 1 207 and the second motor 202 is controlled by an MCU2 208, and MCU1 207, MCU2 208, and a battery 220 are connected through a high voltage power line. A GCU 212, the MCU1 207, the MCU2 208, and a BMS 222 are controlled by a Hybrid Control Unit (HCU) 230.

The engine-generator control methods in accordance with the above embodiments are performed by the HCU 230 of the 4WD series hybrid electric combat maneuvering system 200 and may control an engine-generator 210 while operating in conjunction with the GCU 212.

In this way, the engine-generator control method and the series hybrid electric combat maneuvering system using the control method according to the present embodiments may take into consideration both the efficiencies of an engine-generator and a high-voltage battery, thus controlling the operation of the engine-generator. Further, the present inventive concept controls the operation of the engine-generator by utilizing a stop-and-go driving method which turns off the engine-generator if a vehicle stops, and turns on the engine-generator if the vehicle starts to move (go). Therefore, the present inventive concept can improve the efficiency of the overall system while improving the durability of electronic parts including an engine and the convenience of driving and enhancing energy efficiency.

As described above, the present inventive concept can improve the efficiency of the overall system, and vary the power of the engine depending on the condition of an accelerator pedal, maintain the voltage of the battery at constant voltage, and can reduce the power of the engine-generator when the vehicle is moving at low speed or is stopped, so that the engine-generator can be easily turned on or off, thus improving the convenience of driving and the durability of the system.

Further, the present inventive concept can reduce noise while reducing unnecessary fuel consumption by turning off the engine-generator when the combat maneuvering system is stopped, and can improve the efficiency of energy distribution by again turning on the engine when a driver starts the vehicle.

Although the present inventive concept has been described with reference to specific items such as detailed components, limited embodiments, and the attached drawings, those items, embodiments, etc. are merely provided to help clear understanding of the present inventive concept, and are not intended to limit the present inventive concept to the above embodiments, and those skilled in the art will change and modify the present inventive concept in various manners from the above description.

Therefore, the spirit of the present inventive concept should not be defined by the above-described embodiments and it should be understood that the accompanying claims and all equivalents or modifications thereof belong to the spirit and scope of the present inventive concept.

What is claimed is:

1. An engine-generator control method for controlling an engine-generator to supply power to a series hybrid electric combat maneuvering system having a battery and a drive motor, comprising:
   (a) detecting an acceleration pedal displacement signal and a brake pedal displacement signal, and calculating a requested power that is total power of the drive motor requested by a driver;
   (b) assuming power values of the engine-generator at equidistant intervals from minimum power to maximum power of the engine-generator;
   (c) calculating a power value of the battery required to satisfy total power of the drive motor requested by the driver, using the assumed power values of the engine-generator and the requested power;
   (d) calculating an efficiency value of the engine-generator using an efficiency map of the engine-generator, and calculating an efficiency value of the battery using an efficiency map of the battery as a function of the battery power and a measured State Of Charge (SOC) of the battery;
   (e) calculating system efficiencies of the combat maneuvering system, for every assumed power value of the engine-generator at the equidistant intervals, using the efficiency of the engine-generator and the efficiency of the battery; and (f) selecting an assumed power of the engine-generator, obtained for a highest system efficiency, and controlling the engine-generator at the selected assumed power.

2. The engine-generator control method of claim 1, further comprising:

when the engine-generator is controlled at the assumed power of the engine-generator selected by performing (a) to (f), if a velocity of the combat maneuvering system is less than or equal to a preset velocity reference value, and a displacement of the brake pedal is equal to or greater than a preset first displacement reference value, turning off the engine-generator, and again performing (a) to (f);

when the engine-generator is controlled at the assumed power of the engine-generator selected by performing (a) to (f), if the displacement of the brake pedal is less than or equal to a preset second displacement reference value and a gear of the combat maneuvering system is in a forward-drive position or in a backward-drive position, and if the selected assumed power of the engine-generator is less than or equal to a preset power reference value, turning on the engine-generator, and again performing (a) to (f).

3. The engine-generator control method of claim 2, wherein the velocity reference value is set to 1 kph, the first displacement reference value is set to 5%, the second displacement reference value is set to 3%, and the power reference value is set to 45 kW.

4. The engine-generator control method of claim 2, wherein when a rotational speed of the drive motor corresponding to the velocity of the combat maneuvering system requested by the driver is $N_m$[rpm], and a requested torque of the driver is $T_{req}$[Nm], the requested power value $P_{req}$[kw] is calculated by the following Equation (1):

$$P_{req} = \frac{2\pi}{60} \times N_m \times T_{req} \times \frac{1}{1000}. \tag{1}$$

5. The engine-generator control method of claim 4, wherein the battery power $P_{bat}$ using the assumed power $P_{gen}$ of the engine-generator and the requested power $P_{req}$ is calculated by the following Equation (2):

$$P_{bat} = P_{req} - P_{gen} \tag{2}$$

6. The engine-generator control method of claim 4, wherein when the efficiency value of the engine-generator is $\eta_{gen}$ and the efficiency of the battery is $\eta_{bat}$, the system efficiency $\eta_{sys}$ is calculated by the following Equation (3):

$$\eta_{sys} = \eta_{gen} \times \eta_{bat} \tag{3}$$

7. A Series hybrid electric combat maneuvering system, comprising:
- a drive motor connected to an axle via a reduction gear;
- a Motor Control Unit (MCU) configured to control the drive motor;
- an engine-generator configured to generate electric power;
- a Generator Control Unit (GCU) configured to control the engine-generator;
- a high voltage battery;
- a Battery Management System (BMS) configured to manage the high voltage battery; and
- a Hybrid Control Unit (HCU) configured to control the MCU, the GCU, and the BMS, wherein the HCU is configured to:
- detect an accelerator pedal displacement signal and a brake pedal displacement signal, and calculate a requested power that is total power of the drive motor requested by a driver,
- assume power values of the engine-generator at equidistant intervals from minimum power to maximum power of the engine-generator,
- calculate a power value of the battery required to satisfy total power of the drive motor requested by the driver, using the assumed power values of the engine-generator and the requested power,
- calculate an efficiency of the engine-generator using an efficiency map of the engine-generator, and calculate an efficiency of the battery using an efficiency map of the battery as a function of the battery power and a measured State Of Charge (SOC) of the battery,
- calculate system efficiencies of the combat maneuvering system, for every assumed power value of the engine-generator at, the equidistant intervals, using the efficiency of the engine-generator and the efficiency of the battery, and
- select an assumed power of the engine-generator, obtained for a highest system efficiency, and control the engine-generator at the selected assumed power.

* * * * *